United States Patent [19]

Wakabayashi

[11] Patent Number: 4,643,555
[45] Date of Patent: Feb. 17, 1987

[54] CAMERA WITH SWITCHABLE FOCAL LENGTH

[75] Inventor: Hiroshi Wakabayashi, Yokohama, Japan

[73] Assignee: Nippon Kogaku K. K., Tokyo, Japan

[21] Appl. No.: 772,710

[22] Filed: Sep. 5, 1985

[30] Foreign Application Priority Data

Sep. 12, 1984 [JP] Japan .................................. 59-191272

[51] Int. Cl.⁴ ............................................... G03B 3/10
[52] U.S. Cl. .................................. 354/403; 354/195.12
[58] Field of Search .................... 354/400, 403, 195.12, 354/195.1

[56] References Cited

U.S. PATENT DOCUMENTS

| | | | |
|---|---|---|---|
| 3,678,835 | 7/1972 | Takishima | 354/403 |
| 3,925,797 | 12/1975 | Ettischer | 354/195.11 |
| 4,063,260 | 12/1977 | Toyoshima | 354/195.11 X |
| 4,065,778 | 12/1977 | Harvey | 354/403 |
| 4,214,829 | 7/1980 | Ohashi | 354/195.12 |
| 4,482,228 | 11/1984 | Fujita | 354/195.12 |
| 4,525,050 | 6/1985 | Ohashi | 354/195.12 |
| 4,536,068 | 8/1985 | Kodaira | 354/195.12 |
| 4,540,264 | 9/1985 | Daitoku et al. | 354/400 |

Primary Examiner—William B. Perkey
Attorney, Agent, or Firm—Shapiro and Shapiro

[57] ABSTRACT

A camera is provided with a rotary member capable of continuous rotation in relation to the movement of a photographing lens in the axial direction. The photographing lens is axially moved in response to the switching of focal length from a wide angle range to a telescopic range, and is also axially moved for focusing in each focal length. There are further provided a position detector which is driven by the rotary member and generates a signal indicating the position of the photographing lens, and a distance measuring device driven by the rotary member.

8 Claims, 17 Drawing Figures

CAMERA WITH SWITCHABLE FOCAL LENGTH

BACKGROUND OF THE INVENTION

1. Field of the Invention

The present invention relates to a camera with an automatic focusing device, and more particularly to a camera capable of selecting one of two different focal lengths according to the positional change of a main lens system in the axial direction thereof.

2. Description of the Prior Art

A so-called two focal-length camera, capable of switching the focal length of a photographing lens at least between two different values by inserting a subsidiary optical system in the optical axis of a main optical system which can alone take pictures, is already disclosed for example in the Japanese Patent Laid-open Application No. 202431/1983. Said known camera is equipped with an automatic focusing device linked with the main optical system.

However, said known two focal-length camera is provided, in addition to a moving mechanism for focusing the main optical system, with a separate mechanism for moving the main optical system in order to switch the focal length thereof by inserting a subsidiary optical system. For this reason the moving mechanism for the main optical system has to be complicated.

Also in the above-described two focal-length camera, the focusing operation is achieved by the movement of the main optical system only, even after the insertion of the subsidiary optical system. Consequently, in a camera so designed as to achieve automatic focusing by the combined movement of the main optical system and the subsidiary optical system, automatic focusing can only be achieved in the absence of the subsidiary optical system.

Also in the above-described two focal-length camera with known automatic focusing device, information on the lens position transmitted from the main optical system does not contain information on the change of focal length. Thus, in order to compensate the change in aperture resulting from the change in focal length, there should be added a link mechanism for changing the aperture in relation to the movement of the main or subsidiary optical system for changing the focal length. Furthermore, in case of equipping the above-described known two focal-length camera with a flashmatic device, there should be separately added a device for transmitting the information on focal length, so that the mechanism for moving the lens has inevitably to be complicated.

SUMMARY OF THE INVENTION

An object of the present invention is to provide, in a camera capable of switching the focal length as explained above, an improved structure for automatic focusing Another object of the present invention is to provide a camera capable of correctly transmitting precise information on the photographing distance for each focal length in response to the position of the photographing lens on the optical axis thereof, and efficiently transmitting information on the switchable focal length and still reducing the required space.

According to the present invention there is provided a rotary member capable of continuous rotation in relation to the movement of the photographing lens in the axial direction. The photographing lens is axially moved in response to the switching of focal length from a wide angle range to a telescopic range, and is also axially moved for focusing in each focal length. There are further provided a position detector which is driven by said rotary member and generates a signal indicating the position of the photographing lens, and a distance measuring device driven by said rotary member.

BRIEF DESCRIPTION OF THE DRAWINGS

FIGS. 2 and 3 are cross-sectional views of a two focal-length camera incorporating the embodiment shown in FIG. 1, wherein FIG. 2 shows a wide-angle state while FIG. 3 shows a telescopic state;

FIGS. 13 to 16 are views showing the function of a lever link mechanism in the embodiment shown in FIG. 1, wherein FIG. 13 shows a state in which the base plate is at the infinite distance position in the wide-angle range, FIG. 14 shows a state in which the base plate is at the closest photographing distance position in the wide-angle range, FIG. 15 shows a state in which the base plate is at the infinite distance position in the telescopic range, and FIG. 16 shows a state in which the base plate is at the closest photographing distance position in the telescopic range.

DESCRIPTION OF THE PREFERRED EMBODIMENTS

Figure 1:
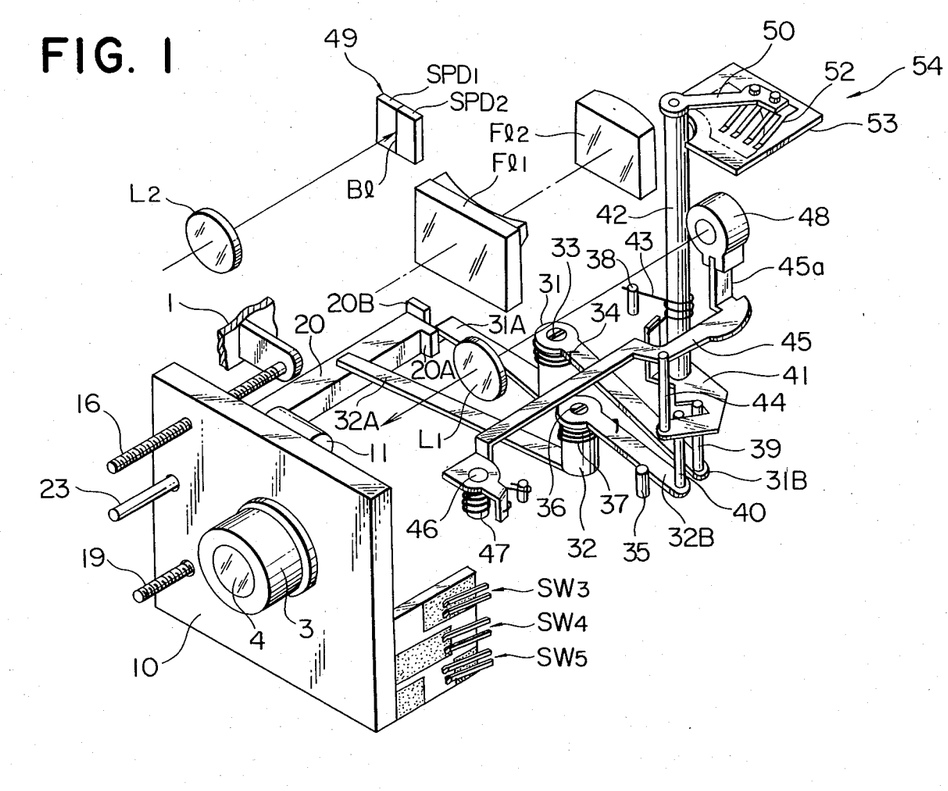
FIG. 1 is a perspective view showing an embodiment of the present invention.
Figure 2:
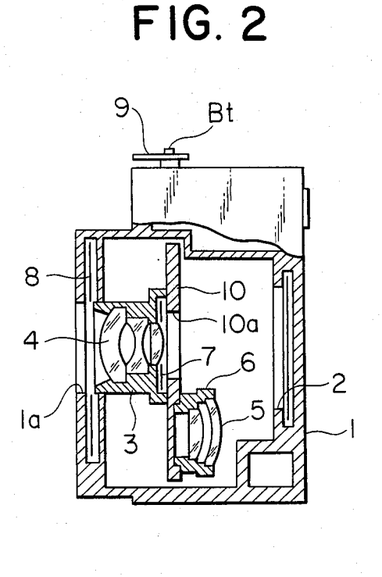

Referring to FIGS. 1 and 2, in front of an exposure aperture 2 in a camera body 1 there is movably provided a base plate 10 which is to be explained later in greater detail. The base plate 10 is provided, approximately in the center thereof, with an aperture 10a, and a main lens 4 constituting the photographing lens is supported in a main lens frame 3 fixed to the front face of the aperture 10a. A subsidiary lens 5 is supported in a movable lens frame 6, and is retracted from the photographing optical path in the wide-angle state shown in FIG. 2 or inserted into the optical path in the telescopic state shown in FIG. 3. Between the main lens 4 and the base plate 10, there is provided a shutter 7 which also serves as an aperture and moves integrally with the main lens 4.

The front face of the camera body 1 is provided with an aperture 1a in which the main lens 3 can pass, and inside the aperture there is provided a dust cover 8 for closing the aperture 1a, the dust cover 8 being opened or closed by a focal length selector lever 9 positioned on the upper part of the camera body 1.

Figure 4:
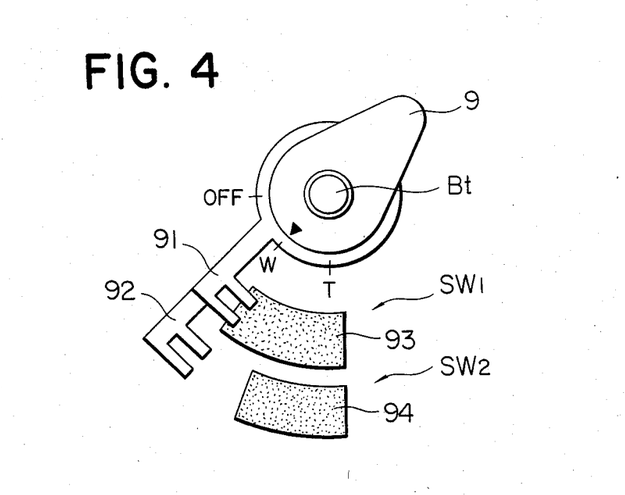
FIG. 4 is a plan view of a selector switch.

As shown in FIG. 4, the selector lever 9 is provided with sliding contacts 91, 92 respectively in contact with conductor lands 93, 94 respectively connected to a circuit for controlling the motor rotation as will be explained later. The conductor land 93 and the sliding contact 91 constitute a switch Sw1, while the land 94 and the contact 92 constitute another switch Sw2. The switch Sw1 is closed when the selector lever 9 is positioned at W for wide-angle state or T for telephoto state, and is opened when the lever is positioned at OFF. The switch Sw2 is closed when the selector lever 9 is positioned at T for telephoto state and is opened otherwise.

Figure 5:
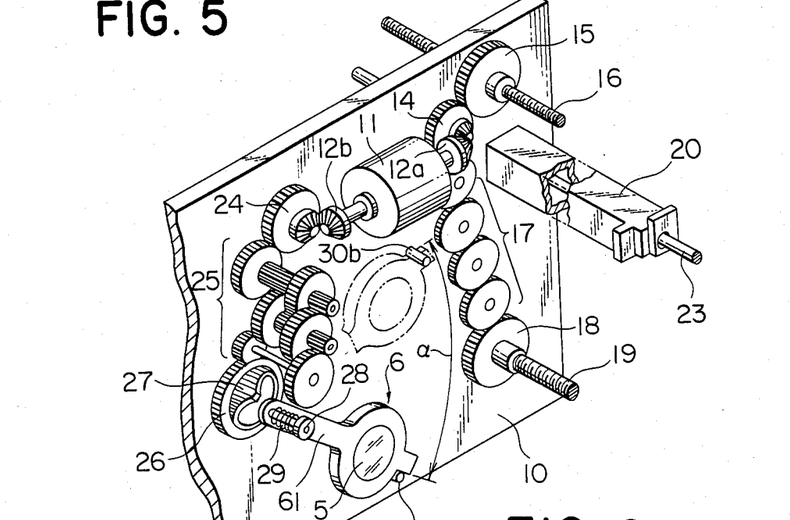
FIG. 5 is a perspective view of the rear side of a base plate shown in FIG. 1.

The base plate 10 and the movable lens frame 6 are moved by a mechanism shown in FIG. 5. A motor 11 mounted on the base plate 10 carries bevel gears 12a, 12b on both ends of the shaft. The motor rotation is transmitted through a gear 14 to another gear 15 bearing a female lead screw, which engages with a feed screw 16 extending in the direction of optical the axis and fixed on a part of the camera body.

Also the rotation of the gear 14 is transmitted, through a gear train 17, to another gear 18 also bearing a female lead screw, which engages with a feed screw 19 extending in the direction of optical the axis and fixed on a part of the camera body. The gears 15, 18 are so designed to have the same number of rotations, and the feed screws 16, 19 are so designed to have the same pitch. Thus, in response to the rotation of the motor 11, the gears 15, 18 are rotated to move the base plate 10 in the direction of the optical axis along the feed screws 16, 19.

In a pillar 20 fixed perpendicularly to the base plate 10, there is provided a guide shaft 23 fixed to the camera body and extending in the direction of the optical axis. The base plate 10 is supported perpendicular to the optical axis by means of the pillar 20 and guide shaft 23, and performs parallel displacement along the optical axis by the rotation of the motor 11.

The rotation of the other gear 12b fixed to the motor 11 is transmitted, through a flat gear 24 and a reducing gear train 25, to a cam gear 26, which has a front-face cam 27 on the surface thereof. A handle portion 61 of the lens frame 6 supporting the subsidiary lens 5 is rotatably supported, together with the cam gear 26, by a shaft 28 fixed on the base plate 10, and is biased against the cam face of the cam 27 by means of a coil spring 29.

The base plate 10 is provided with pins 30a, 30b for defining the movement of the lens frame 6. The subsidiary lens 5 is in a full-lined retracted position in FIG. 5 or in a chain-lined inserted position in FIG. 5 respectively when the lens frame 6 is in contact with the pin 30a or 30b.

Figures 6, 7:
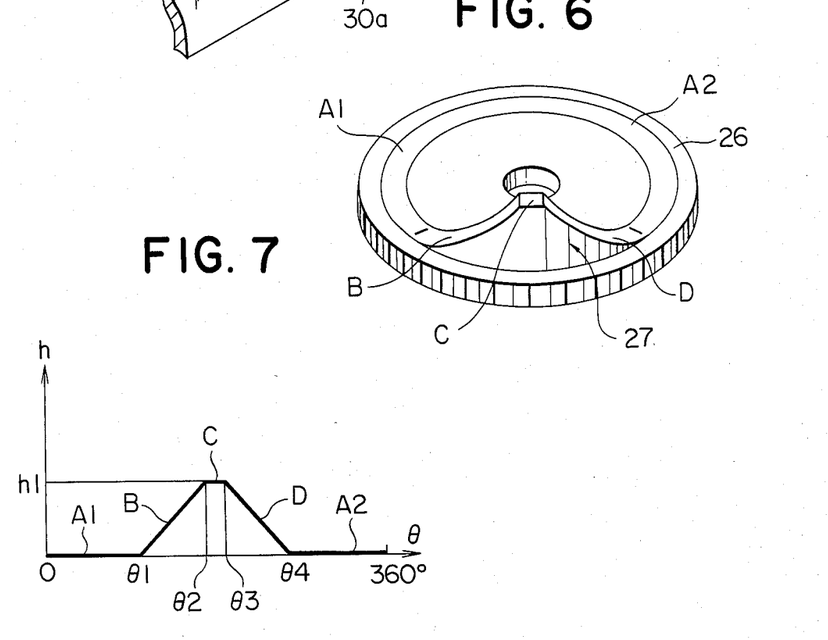
FIG. 6 is a perspective view of a front-face cam shown in FIG. 5.
FIG. 7 is a chart showing the curve of said cam.

As shown in FIG. 6, the cam 27 has an annular shape with a lifting stroke in the axial direction of the gear 26.

FIG. 7 is a chart showing the shape of the cam 27, which is provided with a first flat zone A1 with zero stroke of an angular range from 0 to $\theta 1$, a first ramp zone B in which the stroke linearly increases from 0 to h1 over an angular range from $\theta 1$ to $\theta 2$, a second flat zone C with a constant stroke h1 over an angular range from $\theta 2$ to $\theta 3$, a second ramp zone D in which the stroke linearly decreases from h1 to zero over an angular range from $\theta 3$ to $\theta 4$, and a third flat zone A2 with zero stroke of an angular range from $\theta 4$ to 360°.

Figure 3:
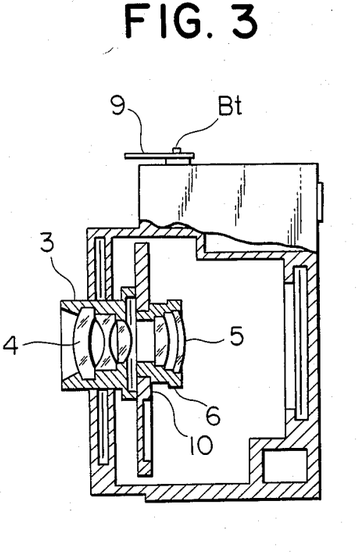

When the handle 61 of the lens frame 6 engages with the flat zone A1 or A2, the subsidiary lens 5 is respectively in the retracted position shown in FIG. 2, or in the inserted position shown in FIG. 3. When the cam 27 is rotated in either direction to bring the ramp range B or D in contact with the handle 61, the lens frame 6 is moved in the axial direction and is then rotated by an angle $\alpha$ by the shaft 28. When the handle 61 passes the flat zone C and descends along the ramp zone D or B, the lens frame 6 stops at the wide-angle state shown in FIG. 2 or at the telephoto state shown in FIG. 3.

Figure 8:
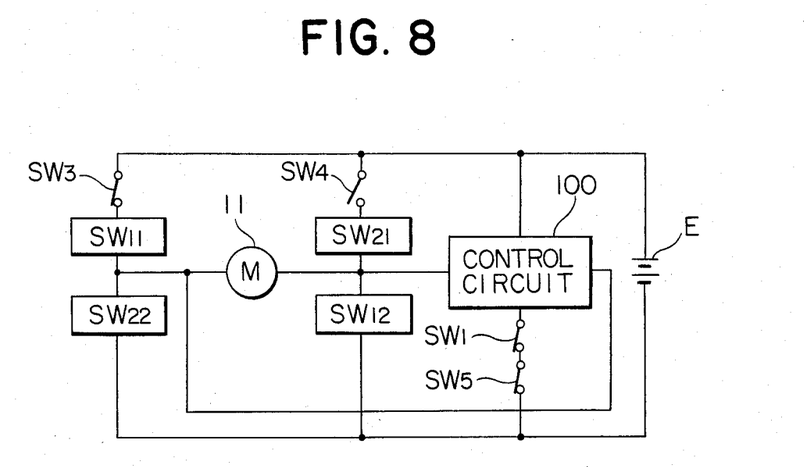
FIG. 8 is a diagram of a motor driving circuit.
Figure 9:
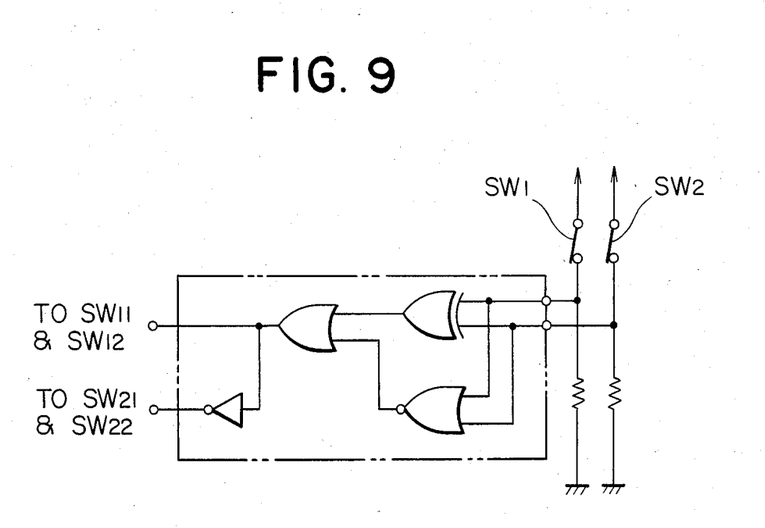
FIG. 9 is a diagram of a logic circuit.

FIG. 8 shows a driving circuit for the motor 11 for moving the lenses 4, 5. Switches Sw1, Sw2 correspond to those linked with the selector lever 9 shown in FIG. 4, while switches Sw3, Sw4 and Sw5 are composed of conductor lands fixed on the base plate 10 shown in FIG. 1 and a group of terminals fixed to the camera body. Switches Sw11, Sw12, Sw21 and Sw22 are semiconductor switches controlled by a logic circuit shown in FIG. 9. The motor 11 rotates in the forward direction when energized by a circuit through the switches Sw3, Sw11 and Sw12, or in the reverse direction when energized by a circuit through the switches Sw4, Sw21 and Sw22 under the control of a control circuit 100, thus achieving automatic focusing. When the selector lever 9 is rotated from the OFF position to the wide-angle position W, the dust cover 8 is opened through an unrepresented link mechanism, and the switch Sw1 is closed as shown in FIG. 4. In this state the main lens 4 alone is positioned on the photographing optical axis as shown in FIG. 2, and the base plate 10 is at the right-end infinite distance position in the wide-angle range. In response to the depression of a shutter release button Bt, the motor 11 is activated to move the base plate 10 toward left in FIG. 2, to achieve focusing operation in the wide-angle range. In this operation the distance to the object is measured by a distance detector to be explained later and the motor 11 is accordingly controlled. During the focusing operation, the lens frame 6 is maintained in contact with the flat zone A1 of the cam 27 and does not show relative movement to the base plate 10.

When the selector lever 9 is moved from the wide-angle position W to the telephoto position T, the switch Sw2 is closed to activate the motor 11, whereby the base plate 10 is moved to left in FIG. 2 beyond the closest photographing distance position in the wide-angle range and is stopped at the infinite distance position for the telephoto range. During this movement, the cam 27 is rotated to bring the ramp zone B thereof in contact with the handle 61 of the lens frame 6, whereby the lens frame 6 is disengaged from the base plate 10 by a movement along the shaft 28 toward the image plane, and is rotated counterclockwise by an angle $\alpha$ together with the cam 27 to the chain-lined position in FIG. 5.

Even after the lens frame 6 comes into contact with the pin 30b, the cam 27 continues to rotate until the handle 61 passes the zones C, D and comes into contact with the zone A2, whereby the lens frame 6 returns to the object side along the shaft 28 and touches the base plate 10 on the optical axis of the main lens 4. In this manner a telephoto lens system is formed by the combination of the subsidiary lens 5 and the main lens 4. These lenses further move to the left together with the base plate 10, and terminate the movement when the base plate 10 reaches the infinite distance position in the telephoto range.

When the shutter release button Bt is depressed in the telephoto state, the motor 11 is again activated to move the base plate 10 to the left in FIG. 3, thus achieving focusing operation in the telephoto range.

In the following there will be explained the structure of a distance detector and a distance signal generator linked with the base plate 10.

Again referring to FIG. 1, the pillar 20 fixed to the base plate 10 is provided, at an end thereof, with mutually perpendicular two projections 20A, 20B, and the projection 20A engages with an arm 31A of a link lever 31. On the other hand, the projection 20B is so constructed as to engage with an arm 32A of another link lever 32, in the course of movement of the base plate 10 to the telephoto range. The link lever 31 is rotatably supported by a shaft 33, counterclockwise biased by a coil spring 34 and the rotation is limited by a pin 35. Also the link lever 32 is rotatably supported by a shaft 36, biased clockwise by a coil spring 37 and the rotation is limited by a pin 38. The other arms 31B, 32B of the link levers 31, 32 are respectively provided with pins 39, 40, which engage with a rotary lever 41 provided at an end of a rotary shaft 42 and clockwise biased by a coil spring 43.

A counterclockwise rotation of the link lever 31 causes the pin 39 to rotate the rotary lever 41 counterclockwise, and the pin 40 engages with the rotary lever 41 rotated by the pin 39.

The rotary lever 41 is provided, at a free end thereof, with a sliding pin 44 engaging with a cam lever 45, which is rotatably supported at an end thereof by a shaft 46 and is clockwise biased by a coil spring 47. The cam lever 45 is further provided, at the free end thereof, with a bent portion 45a, carrying a light-emitting element 48 such as an infrared light-emitting diode. Furthermore, the cam lever 45 is provided with three cam faces to be explained later, in the engaging portion with the sliding pin 44.

An infrared spot beam from the light-emitting element 48 is projected through a projection lens L1 positioned on the axis of the shaft 46 rotatably supporting the cam lever 45, and the infrared spot beam reflected by the object is received, through a lens L2, by a photosensor 49 composed of two photodiodes SPD1, SPD2. The cam lever 45, light-emitting element 48, projection lens L1, lens L2 and photosensor 49 constitute a distance detector by angular measurement. The object subjected to distance detection can be viewed through a finder optical system composed of an objective lens Fl1 and an eyepiece lens Fl2, positioned between the projection lens L1 and receiving lens L2.

Figure 10:
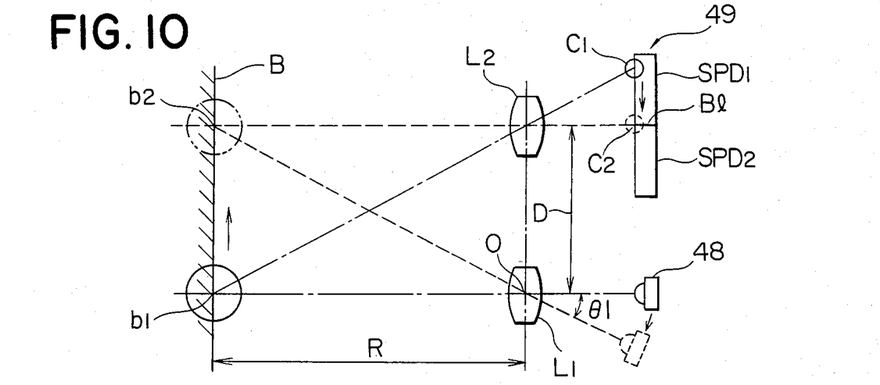
FIG. 10 is a schematic view showing the principle of a distance detector.

FIG. 10 shows the working principle of the distance detector by angle measurement. The photosensor 49 is so positioned that the boundary Bl of the photodiodes SPD1, SPD2 crosses the optical axis of the receiving lens L2, and the light-emitting element 48 is at first positioned at a reference position on the optical axis of projection lens L1, which is parallel to that of said receiving lens L2. In this case the light beam emitted from the element 28 is focused through the projection lens L1 to form a light spot at a position b1 on the object B, present in the approximate center of the viewing field of the finder optical system. The light reflected from the position b1 is guided through the receiving lens L2 to form a light spot on a point C1 on a photodiode SPD1.

In combination with the movement of the photographing lens, the light emitting element 48 performs a rotary motion around the projection lens L1, whereby the light spot at the point b1 of the object B moves toward a point b2 on the optical axis of the receiving lens L2, and the light reflected from the light spot moves toward a point C2 on the boundary Bl. When the reflected light reaches the point C2, the outputs of the photodiodes SPD1 and SPD2 become mutually equal, thus indicating in-focus state.

The distance to the object B can be determined by the following equation:

$$R = D/\tan\theta_1 \quad (1)$$

wherein R is the distance from the projection lens L1 to the object, D is the distance or base line length between the projection lens L1 and receiving lens L2, and $\theta_1$ is the angle of rotation of the light-emitting element 28.

On the other hand, there stands an equation:

$$\Delta = f^2/R_0 \quad (2)$$

in which f is the focal length of the photographing lens, $R_0$ is the photographing distance, and $\Delta$ is the amount of movement of the photographing lens from the infinite distance position thereof, wherein f is assumed to be sufficiently smaller than R.

Assuming that $R \simeq R_0$, the following equation can be derived from the foregoing equations (1) and (2):

$$\Delta = f^2 \cdot \tan\theta_1/D \quad (3).$$

Thus, the amount of forward movement of the photographing lens is proportional to the square of the focal length thereof and to the amount of movement $\tan\theta_1$ of the light-emitting element. On the other hand, $\tan\theta_1$ is determined, as will be apparent from the equation (1), by the distance R to the object, independently from the focal length f of the photographing lens. Consequently the amount of movement of the base plate 10 for focusing has to be varied according to the change in focal length of the photographing lens, but the amount of movement of the light emitting element 48 corresponding to a given photographing distance has to be constant regardless of the change in the focal length.

On the other hand, as will be apparent from the equation (2), the amount $\Delta$ of movement of the photographing lens is related with the photographing distance $R_0$ and the focal length f of the photographing lens. Consequently, in case of equipping a camera with switchable focal length for example with a flashmatic device, it becomes necessary to control the aperture in response to the movement of the photographing lens, in order that the lens aperture can be determined according to the photographing distance, on the basis of a reference aperture corresponding to each of two different focal lengths.

Again referring to FIG. 1, the rotary shaft 42 of the rotary lever 41 is provided with an arm 50, carrying a brush 52 sliding on a board 53.

Thus the brush 52 is rotated integrally with the rotary lever 41 by the link levers 31, 32.

Figure 11:
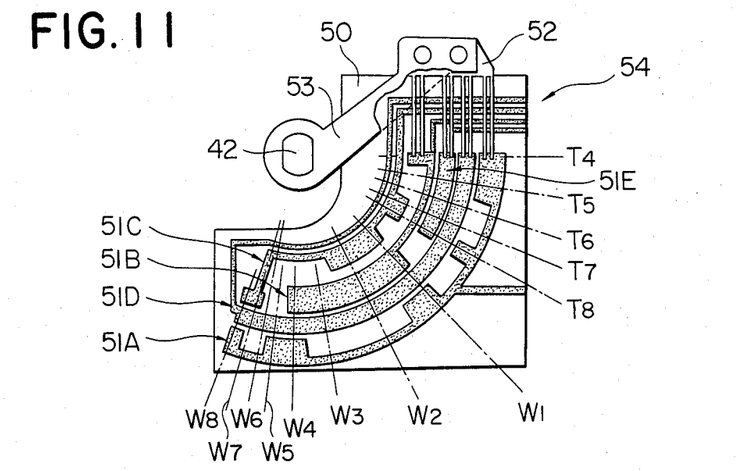
FIG. 11 is an enlarged plan view of an encoder.

FIG. 11 shows an encoder 54, comprising code patterns 51 and sliding brush 52 for generating a focal length signal and a photographing distance signal. The code patterns constitute 3-bit codes by suitably connecting code patterns 51A, 51B, 51C with a common pattern 51D with the sliding brush 52. Positions W1–W8 of the brush 52 correspond to the wide-angle state, while positions T4–T8 correspond to the telephoto state. Another pattern 51E identifies the wide-angle state from the telephoto state. The following table summarizes the relationship between the photographing distance and the code patterns obtained by the movement of the brush 52.

TABLE

| Focal length | Step | Photo-graphing distance (m) | Code a (51A) | Code b (51B) | Code c (51C) | Code e (51E) |
|---|---|---|---|---|---|---|
| Wide angle | W1 | 0.4 | ON | ON | ON | |
| | W2 | 0.6 | | ON | ON | |
| | W3 | 1.1 | | ON | | |
| | W4 | 1.6 | ON | ON | | |
| | W5 | 2.4 | ON | | | |
| | W6 | 4 | | | | |
| | W7 | 8 | | | ON | |
| | W8 | infinite | ON | | ON | |
| Tele-photo | T4 | 1.6 | ON | ON | | ON |
| | T5 | 2.4 | ON | | | ON |
| | T6 | 4 | | | | ON |
| | T7 | 8 | | | ON | ON |
| | T8 | infinite | ON | | ON | ON |

Note: Blank indicates that code is OFF.

Figure 12:
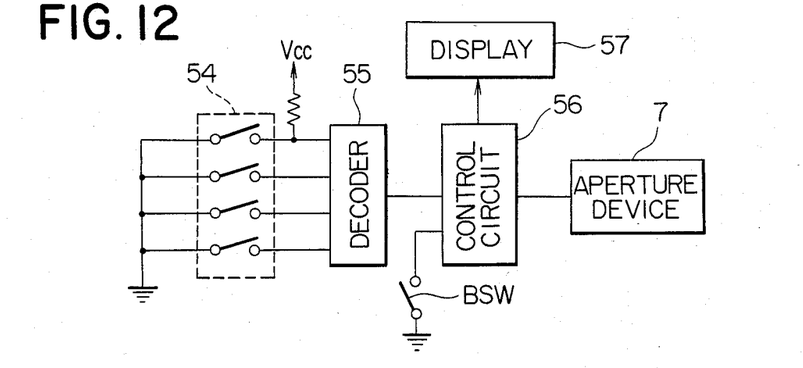
FIG. 12 is a diagram showing an aperture determining circuit in which the embodiment of FIG. 1 is applied to a flashmatic aperture determining device.

The rotation of the rotary shaft 42 is encoded by the encoder 54, and the resulting codes a, b, c and e shown in the foregoing table are read by a decoder 55 shown in FIG. 12 for supplying a corresponding analog output to control circuit 56. Thus the corresponding photographing distance is displayed by a display unit 57 through the control circuit 56. Also the analog signal is converted by the control circuit 56 into a current signal, which is supplied as a control signal to an aperture control device 7 in response to the closing of a flash switch Bsw when a flash unit is used, thus determining an appropriate lens aperture according to the output signal of the encoder 54 and to the focal length of the photographing lens in this state. After the completion of a photograph-taking operation, the base plate 10, light-emitting element 48 and sliding brush 52 are returned to the infinite distance position in relation to the film advancing operation.

In the following there will be given a detailed explanation on the function of the link mechanism for moving the light-emitting element 48 and the sliding brush 52 in the foregoing embodiment, in three cases, i.e. focusing in the wide-angle range, change of the focal length, and focusing in the telephoto range.

Figure 13:
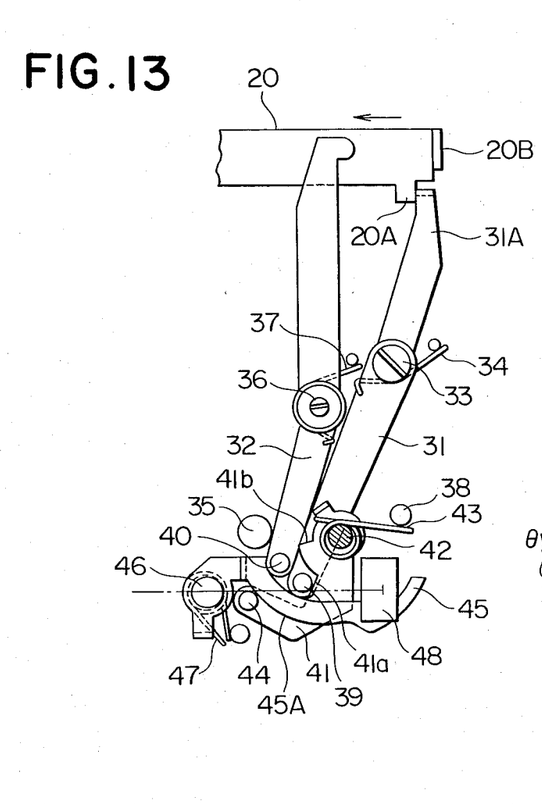
Figure 14:
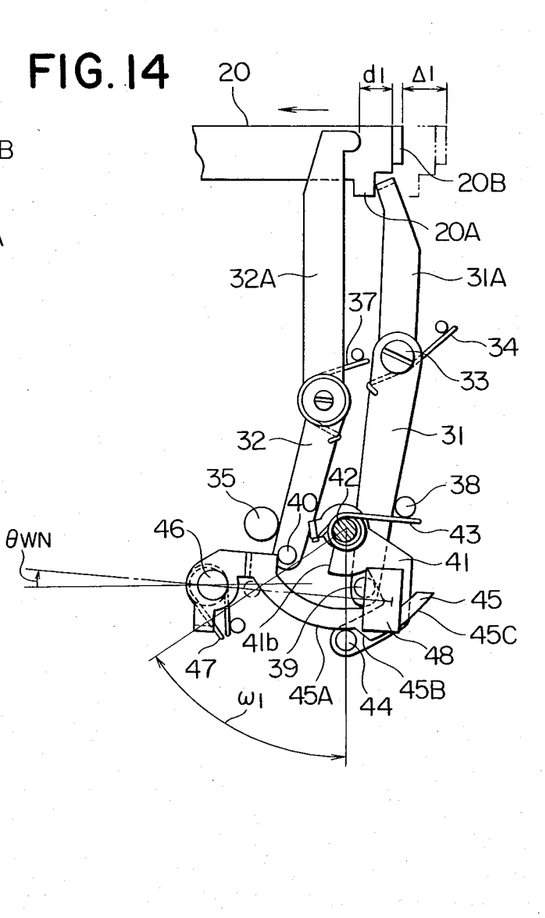
Figure 15:
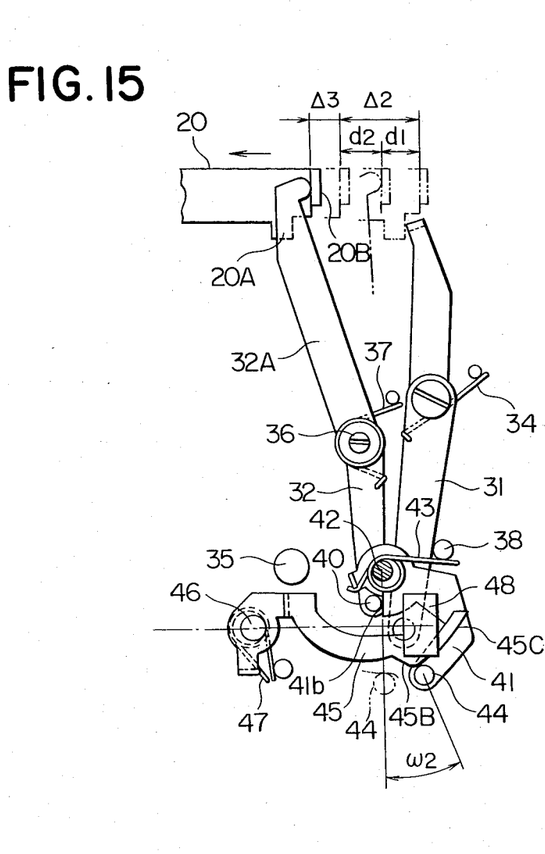
Figure 16:
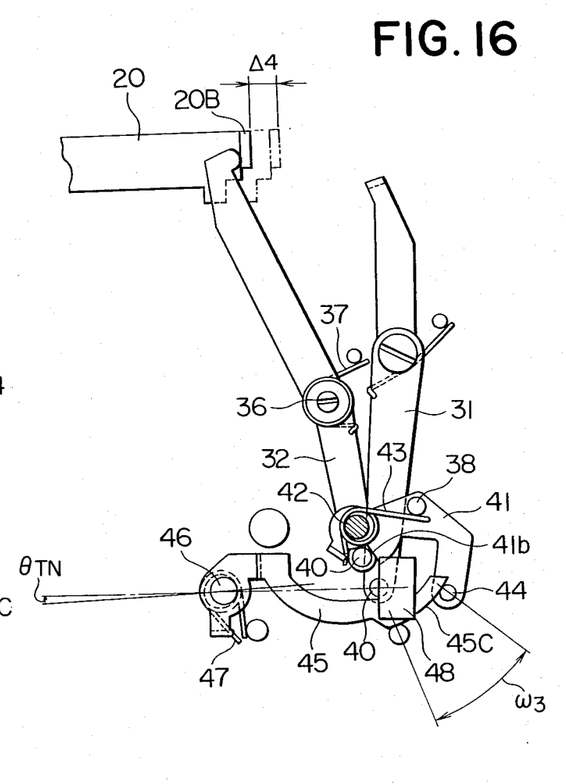

FIGS. 13 to 16 illustrate the function of the link mechanism, wherein FIG. 13 shows a state in which the base plate 10 is in the infinite distance position in the wide-angle range, FIG. 14 shows a state in which the base plate 10 is advanced to the closest photographing distance position in the wide-angle range, FIG. 15 shows a state in which the base plate 10 is in the inifite distance position in the telephoto range, and FIG. 16 shows a state in which the base plate 10 is advanced to the closest photographing distance position in the telephoto range.

At first there will be explained the focusing operation by the main lens 4 alone in the wide-angle range.

In response to the rotation of the selector lever 9 from the OFF position to the wide-angle position W, the switch Sw1 is closed and the dust cover 8 is simultaneously opened. In this state the base plate 10 is at the infinite distance position in the wide-angle range as shown in FIG. 2, and the arm 31A of the link lever 31 is pressed against the projection 20A of the pillar 20 by the biasing force of the coil spring 34. Also the link pin 39 engages with a first engaging portion 41a of the rotary lever 41, and the sliding pin 44 is in contact with an infinite distance position at the base of a wide-angle cam 45A of the cam lever 45. In this state the light-emitting element 48 is positioned on the optical axis of the projection lens L1, and the sliding brush 52 of the encoder 54 is positioned at a step W8.

In the above-described state, an object at a medium distance is aimed at the center of the view-field of the finder, and the shutter release button Bt is depressed, whereby the motor 11 is activated to shift the base plate 10 to the left in FIG. 1. In response the pillar 20 is also moved to the left, whereby the link lever 31 engaging with the projection 20A rotates counterclockwise about the shaft 33 by the biasing force of the coil spring 34.

The rotation of the link lever 31 causes the link pin 39 to press the first engaging portion 41a of the rotary lever 41, thus rotating the same counterclockwise about the rotary shaft 42, together with the sliding pin 44.

The rotation of the sliding pin 44 causes the cam lever 45 to move, following the form of the cam 45 and rotating about the shaft 46, whereby the light-emitting element 48 is moved along a broken line shown in FIG. 10. Consequently the object is scanned with a light spot emitted from the element 48. The light spot reflected from the object reaches a point C2 at the center of the photosensor 49, the focusing control circuit 100, functioning in response to the output signals from the photosensor 49, terminates power supply to the motor 11, thus interrupting the rotation thereof. In this state, the main lens 4 is advanced together with the base plate 10 and stopped at a position where the main lens 4 is focused to the object illuminated by the light spot. The automatic focusing operation is thus completed.

In the above-described operation, the rotation of the rotary lever 41 is transmitted through the rotary shaft 42 to the sliding brush 52 of the encoder 54, whereby the brush 52 moves integrally with the rotary lever 41 from a step position W8 toward a step position W1. The amount of rotation of the brush 52 corresponds to the amount of movement of the base plate 10 from the infinite distance position, so that the encoder 54 releases a digital distance signal indicating the distance to the object, corresponding to the advanced position of the base plate 10. The output signal is displayed, through the decoder 55 and control circuit 56, and a distance to the object or a zone mark on the display unit 57. In case a flash unit is used, the flash switch Bsw is closed whereby the control circuit controls the aperture control device 7 in response to the distance signal and focal length signal supplied from the encoder 54, thus automatically determining an appropriate aperture.

In case of photographing an object at the closest photographing distance, the camera is aimed at the object and the shutter release button Bt is depressed, whereby the base plate 10 and the pillar 20 are advanced by an amount Δ₁ from the double-dotted chain-line position (infinite distance position) in FIG. 14 to reach a closest photographing distance position represented by full lines. In this case the link lever 31 follows the projection 20A by the biasing force of the coil spring 34 to perform counterclockwise rotation and is stopped by the pin 38 when the base plate 10 reaches the closest photographing distance position. Also the counterclockwise rotation of the link lever 31 causes the link pin 39 to counterclockwise rotate the rotary lever 41, whereby the sliding pin 44 thereof is rotated by an angle $\omega_1$ to the right-hand end of the wide-angle cam 45A of the cam lever 45. In response to the movement of the sliding pin 44, the cam lever 45 is rotated clockwise to move the light-emitting element 48 by $\theta_{WN}$ clockwise about the optical axis of the projection lens L1, so that the main lens 4 is focused to the closest distance. At the same time the sliding brush 52 of the encoder 54 slides on the code patterns 51 from a step position W8 to W1, thus releasing a code signal indicating a closest photographing distance, for example 0.4 m, as shown in the foregoing table.

The focusing operation from infinity to shortest distance in the wide-angle state is conducted in the above-explained manner.

Then there will be explained the function of the link mechanism in case of switching the focal length.

In response to a movement of the selector lever 9 from the wide-angle position W to the telephoto position T or from the OFF position to the telephoto position T though the wide-angle position W, the switches Sw1, Sw2 are both closed, whereby the motor 11 is activated without the actuation of the shutter release button Bt to advance the base plate 10 from the infinite distance position in the wide-angle range, beyond the closest photographing distance position thereof. When the pillar 20 moves together with the base plate 10 to the closest photographing distance position for the wide-angle range, the counterclockwise rotation of the link lever 31 is stopped by the pin 38, and the rotary lever 41 engaging with the link pin 39 temporarily terminates rotation in a state, shown in FIG. 14, where the sliding pin 44 is in contact with a closest photographing distance position of the wide-angle cam 45A. Through the rotation of the rotary lever 41, a second engaging portion 41b is inserted into the rotary trajectory of the link pin 40 mounted on the link lever 32.

When the pillar 20 is advanced to the left, beyond the closest photographing distance position of the wide-angle range, the projection 20A is disengaged from the arm 31A of the link lever 31. A further movement of the pillar 20 by $d_1$ causes the projection 20B to engage with the arm 32A of the link lever 32, thus rotating the same counterclockwise. A further movement of the base plate 10 by $d_2$ as shown in FIG. 15 causes the pin 40 to engage with the second engaging portion 41b of the rotary lever 41. Thus the movement of the base plate 10 is not transmitted to the rotary lever 41 in a range of movement of $\Delta_2 = d_1 + d_2$, namely after the base plate 10 exceeds the closest photographing distance position of the wide-angle range and before the pin 40 comes into contact with the second engaging portion 41b. When the base plate 10 is further advanced by $\Delta_3$ after the contact is reached, the rotary lever is again rotated counterclokwise by the pin 40, whereby the sliding pin 44 is rotated by an angle $\omega_2$ from the position shown in FIG. 14 or the double-dotted chain line position in FIG. 13 to engage with a returning cam 45B, thereby rotating the cam lever 45 counterclockwise.

When the sliding pin 44 reaches the infinite distance position of a telephoto cam 45C after passing the returning cam 45B as shown in FIG. 15, i.e. when the base plate and the pillar 20 reach the infinite distance position in the telephoto range by a movement of $\Delta_3$, the power supply to the motor 11 is interrupted by the switches Sw3, Sw4, Sw5 related to the movement of the base plate 10, whereby the motor 11 is stopped and the base plate 10 is simultaneously stopped in the above-mentioned position.

During an interval after the base plate 10 passes the closest photographing distance position in the wide-angle range and before the base plate 10 reaches the infinite distance position in the telephoto range, the subsidiary lens 5 is inserted in the optical axis behind the main lens 4 by means of the gear link mechanism as already explained before. Also during the movement of the base plate 10 for the above-mentioned switching of focal length, the rotary lever 41 rotates by a small angle $\omega_2$ as shown in FIG. 15 to return the light-emitting element 48 to the original position.

Furthermore, in the final stage of the movement of the base plate 10 for the focal length switching, the sliding brush 52 of the encoder 54 moves from a step position W1 to T8, wherein the brush 52 also contacts the pattern 51E. Thus the encoder 54 supplies a focal length identification signal, in addition to the infinite distance signal, to the control circuit 56. In response to the focal length identification signal, the control circuit controls the lens aperture so as to obtain the same F value for two different focal lengths. However, in case a flash unit is used, the lens aperture is controlled to a fully open value in response to the infinite distance signal.

In the following there will be explained focusing operation in the telephoto range.

In a state where the selector lever 9 is placed at the telephoto position T, the main lens 4 is combined with the subsidiary lens 5 as shown in FIG. 3 and the base plate 10 is stopped at the infinite distance position in the telephoto range, the motor 11 is again activated in response to the depression of the shutter release button Bt to further advance the base plate for focusing operation. In this state the pillar 20 is moved to the left from the full-lined infinite distance position shown in FIG. 15, and the link lever 32 rotates counterclockwise. Consequently the link pin 40 presses the second engaging portion 41b of the rotary lever 41 to the right, thus counterclockwise rotating the sliding pin 44 together with the rotary lever 41 about the shaft 42. Following the rotation of the sliding pin 44, the cam lever 45 rotates clockwise according to the shape of the telephoto cam 45C, thus moving the light-emitting element 48 clockwise about the shaft 46.

The rotary movement of the light-emitting element 48 induces scanning with a light spot, thus effecting distance measurement in the telephoto range, in the same manner as in the wide-angle range. In case the object is at the closest photographing distance, the pillar 20 is advanced by $\Delta_4$ as shown in FIG. 16 and the sliding pin 44 is rotated together with the rotary lever 41 by an angle $\omega_3$ to the full-lined position. In this state the light-emitting element 48 is displaced by an angle $\theta_{TN}$ from the optical axis of the projection lens L1, and the motor 11 is stopped to terminate the focusing when the closest photographing distance is detected.

On the other hand, the rotation of the rotary lever 41 in the above-explained focusing in the telephoto range is transmitted, through the rotary shaft 42, to the encoder 54, whereby the sliding brush 52 moves on the code patterns 51 from a step position T8 to T4, thus releasing code signals corresponding to the photographing distance from infinity to closest distance (1.6 m).

Figure 17:
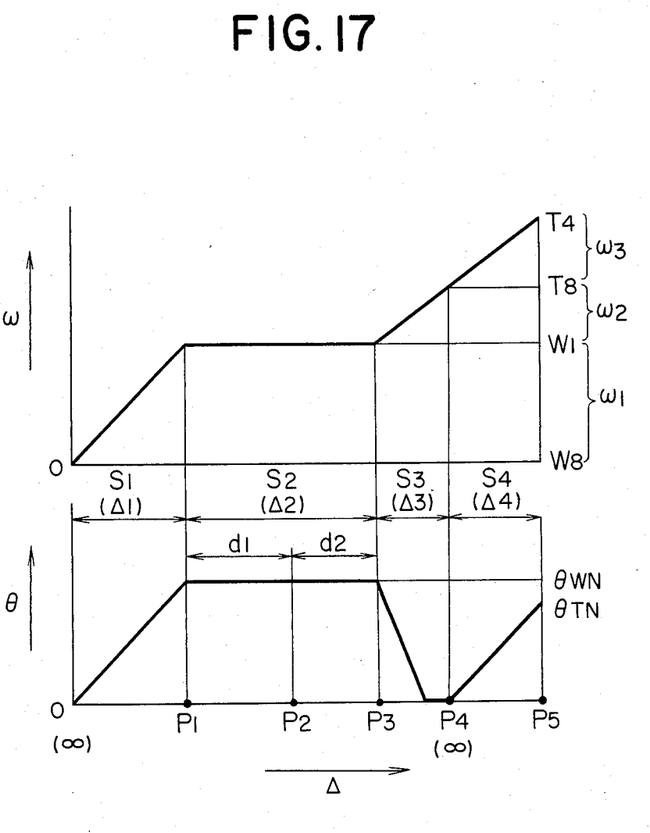
FIG. 17 is a chart showing the relation between the amount of movement of the base plate and the angular change of the brush element or the light-emitting element.

FIG. 17 shows the relationship among the amount $\Delta$ of movement of the base plate 10 or pillar 20, angle $\theta_1$ of movement of the light-emitting element 48 or cam lever 45 and angle ω of rotation of the sliding brush 52 or rotary lever 41.

In FIG. 17, the abscissa indicates the amount Δ of movement of the base plate 10 along the photographing optical axis, taking the most retracted position of the base plate 10, which is the infinite distance position in the wide-angle range, as zero. With the advancement by Δ1 of the base plate 10 to the closest photographing distance position P1 in the wide-angle range S1, the rotary lever 41 is rotated counterclockwise by an angle ω1. In the range S1, the angle θ of movement of the light-emitting element 48 and the angle ω of movement of the sliding brush 52 both increase with the advancement Δ of the base plate.

When the base plate 10 exceeds the point P1, the rotary lever 41 remains still until the base plate 10 is advanced by Δ₂ to a point P3 where the link pin 40 comes into contact with the second engaging portion 41b of the rotary lever 41. In said standstill range S2, the light-emitting element 48 remains at an angle $\theta_{WN}$, and the sliding brush 52 remains at the step position W1 with an angle ω₁.

In response to a further advancement of the base plate 10, the rotary lever 41 is again rotated counterclockwise to return the light-emitting element 48 to the original position, and the base plate 10 reaches the infinite distance position P4 of the telephotorange by an advancement of Δ₃. In this returning range S3, the rotary lever 41 is rotated by ω₂, and the sliding brush 52 of the encoder reaches the step position T8.

When the base plate 10 is further advanced from the position P4 to the closest photographing distance position P5, the rotary lever 41 is rotated by ω₃ as being pushed by the link pin 40, and the sliding brush 52 moves to the step position T4. Also the light-emitting element 48 moves by an angle $\theta_{TN}$. Also in this telephoto range S4, the light-emitting element 48 and the sliding brush 52 move according to the amount of advancement of the base plate 10 from the point P4.

What is claimed is:

1. A camera comprising: photographing optical means including an imaging lens system having an optical axis and a first focal length, and a subsidiary lens system provided to form a second focal length in cooperation with said imaging lens system;
   driving means including a driving source, a first moving member holding said imaging lens system and moved along said optical axis with said imaging lens system, and a second moving member holding said subsidiary lens system and moved with said subsidiary lens system between an active position on said optical axis and a rest position retracted from said optical axis;
   said imaging lens system being adapted to move between mutually independent ranges including a first range, a second range and a third range positioned between said first and second ranges;
   said driving means moving said imaging lens system in said first range for focusing at said first focal length, moving said subsidiary lens system from said rest position to said active position for switching from said first focal length to said second focal length while said imaging lens system is moved in said third range, and moving said imaging lens system in said second range for focusing at said second focal length;
   a rotary member mechanically coupled with said first moving member and being adapted to rotate about a rotary axis, according to the movement of said imaging lens system, to a roary position corresponding to the position of said imaging lens system on said optical axis;
   focusing means including a photosensor, means for forming a light spot on said photosensor by a light beam from an object, light spot moving means mechanically coupled with and driven by said rotary member for causing a relative movement of said light spot on said photosensor, and means for controlling said driving means to move said first moving member until said light spot and said photosensor reach a determined relationship; and
   position detecting means mechanically coupled with and driven by said rotary member and adapted for generating a signal indicating the position of said imaging lens system on said optical axis.

2. A camera according to claim 1, wherein said position detecting means is adapted to generate a signal indicating whether said imaging lens system is in said first, second or third range.

3. A camera according to claim 2, wherein said position detecting means is adapted to further generate a signal indicating the position of said imaging lens system in a range, when said imaging lens system is in said first, second or third range.

4. A camera according to claim 1, wherein said second moving member is adapted to move along said optical axis with said first moving member, and said driving means moves said subsidiary lens system integrally with said imaging lens system in said second range for focusing at said second focal length.

5. A camera according to claim 1, wherein said driving means successively moves said imaging lens system in said first, second and third ranges during the movement of said imaging lens system in one direction along said optical axis, and said light spot moving means moves said light spot in a predetermined direction on said photosensor during the movement of said imaging lens system in said first range, in the opposite direction of said predetermined direction during the movement of said imaging lens system in said second range and in said predetermined direction during the movement of said imaging lens system in said third range.

6. A camera according to claim 1, wherein said light spot moving means includes means for converting the rotation of said rotary member into the movement of said light spot so that said light spot moves by the same amount on said photosensor when said imaging lens system moves in said first, second and third ranges, respectively.

7. A camera according to claim 6, wherein said converting means includes a cam member and a cam follower member.

8. A camera comprising:
   photographing optical means including an imaging lens system having an optical axis and a first focal length, and a subsidiary lens system provided to form a second focal length in cooperation with said imaging lens system;
   driving means including a driving source, a first moving member holding said imaging lens system and moved along said optical axis with said imaging lens system, and a second moving member holding said subsidiary lens system and moved with said subsidiary lens system between an active position on said optical axis and a rest position retracted from said optical axis, said imaging lens system being adapted to move between mutually independent ranges including a first range, a second range and a third range positioned between said first and second ranges;

said driving means moving said imaging lens system in said first range for focusing at said first focal length, moving said subsidiary lens system from said rest position to said active position for switching from said first focal length to said second focal length while said imaging lens system is moved in said third range, and moving said imaging lens system in said second range for focusing at said second focal length;

photosensor means;

means for defining an optical path along which light is transmitted to said photosensor means;

light emitting means spaced from said optical path and adapted to emit light in angular intersecting relation to said optical path to illuminate an object located along a predetermined portion of said optical path; and means for shifting said light emitting means in response to said driving means so as to change an angle between a direction of said light emitting by said light emitting means and said optical path, said shifting means changing said angle from a first angle to a second angle during the movement of said imaging lens system in said first range, changing said angle from said second angle to said first angle during the movement of said imaging lens system in said third range and changing said angle from said first angle toward said second angle during the movement of said imaging lens system in said second range.

* * * * *